United States Patent [19]

Kile et al.

[11] Patent Number: 4,864,731
[45] Date of Patent: Sep. 12, 1989

[54] MEASUREMENT METHOD AND APPARATUS

[76] Inventors: Walter F. Kile, P.O. 77, Zionhill, Pa. 18981; Edwin L. Dickinson, P.O. 297, Zionsville, Pa. 18092

[21] Appl. No.: 941,371
[22] Filed: Feb. 9, 1987
[51] Int. Cl.[4] ............................................. G01B 7/02
[52] U.S. Cl. ..................................................... 33/832
[58] Field of Search ................. 33/169 R, 169 B, 170, 33/171, 172 R E, 143 L, 147 N, 168 B, DIG. 5

[56] References Cited

U.S. PATENT DOCUMENTS

| | | | |
|---|---|---|---|
| 1,942,118 | 1/1934 | Pignone | 33/169 R |
| 2,412,870 | 12/1946 | Champlin | 33/169 R |
| 2,509,986 | 5/1950 | Neff | 33/172 E |
| 2,574,300 | 11/1951 | Stone | 33/147 F |
| 2,833,046 | 5/1958 | Jeglum | 33/172 E X |
| 3,106,023 | 10/1963 | Wilson | 33/170 |
| 3,750,294 | 8/1973 | Becke et al. | 33/147 N X |
| 3,878,984 | 4/1975 | Sotiropoulos | 33/172 E X |
| 4,197,650 | 4/1980 | Bailey et al. | 33/147 N X |
| 4,292,740 | 10/1981 | Vis | 33/172 E |
| 4,503,616 | 3/1985 | Pullen | 33/172 E |
| 4,503,619 | 3/1985 | Nelsen et al. | 33/DIG. 5 X |
| 4,606,129 | 8/1986 | Barrowman et al. | 33/143 L |

FOREIGN PATENT DOCUMENTS 0149410 7/1981 Fed. Rep. of Germany ........ 33/551

Primary Examiner—Harry N. Haroian

[57] ABSTRACT

A self-calibrating measuring tool. The tool includes a housing having a base and a recess terminated by a precisely located flange with respect to the base. A linear movable member is mounted within the housing with a measurement arm attached to it. A transducer is connected to the member for providing a measurement indication.

19 Claims, 5 Drawing Sheets

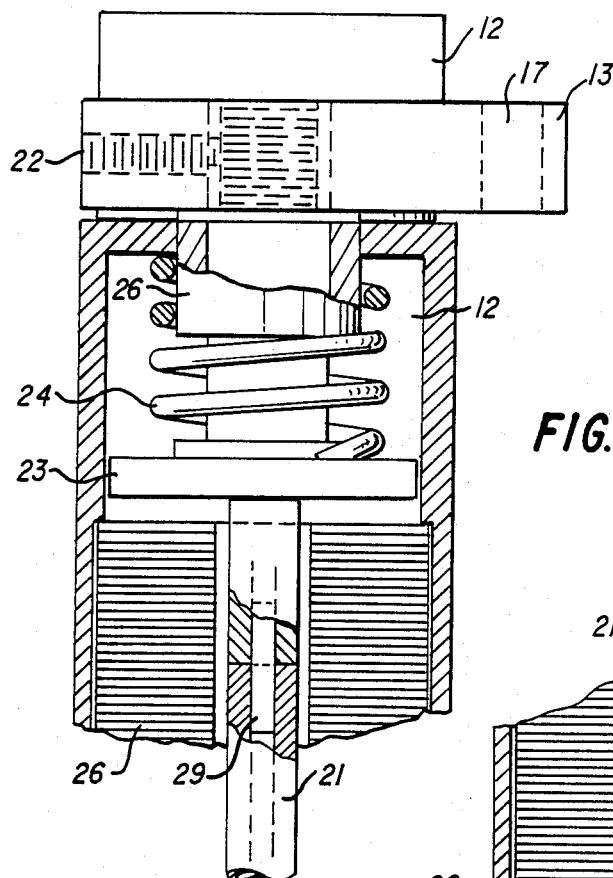
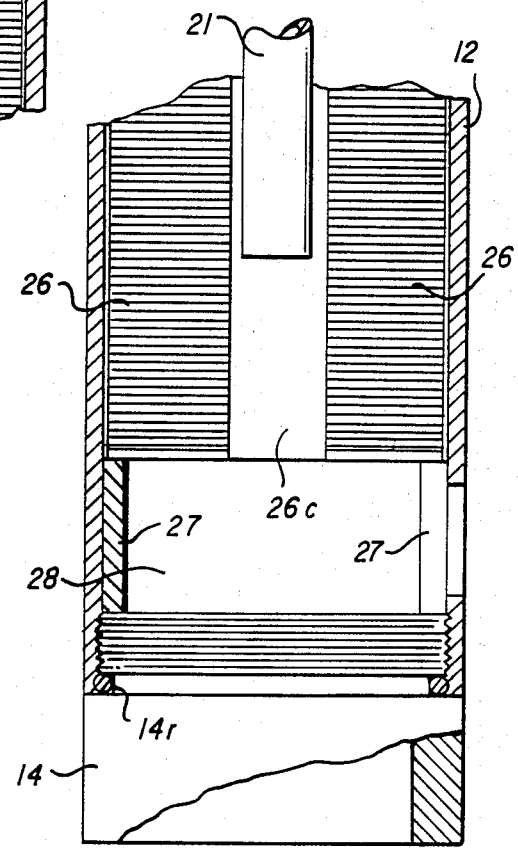
FIG. 2B
FIG. 2C

MEASUREMENT METHOD AND APPARATUS

This invention relates to the precise determination of intervals and more particularly to the precise determination of measurement associated with mechanisms such as engines, and specifically to mechanical intervals.

It is common practice in measurements associated with mechanisms to use a shaft as a support for an attached locking member and to set the support at designated dimensional positions which are designated by a manufacturer in a manual of specifications. This kind of measurement device is imprecise and inconvenient.

Another type of measurement device employs a mechanical indicator which is attached to a base and moved to the position that is to be measured. This kind of device is also imprecise and inconvenient.

Other special tools are available for checking, for example, the relationship between the beveled seat of an injector tube and the firing deck of a cylinder head. A different tool is available for checking valve clearance. Still other tools are available making use of a special base for checking the depth of cylinder liner flanges.

It is apparent that in making various measurements associated with, for example, engines, a number of different measurement tools are employed.

Accordingly, it is an object of the invention to eliminate the need for a multiplicity of different kinds of measurement tools in order to achieve desired measurements. A related object is to consolidate measurement procedures for a plurality of different tools into a single universal tool.

Another object of the invention is to achieve a measurement tool which permits the user a high degree of flexibility, and does not, for example, require that one hand of the user be occupied in positioning the tool, leaving only a single hand for the measurement function. A related object is to achieve a measurement tool in which both hands of the user are free to accomplish the desired measurements.

Still another object of the invention is to realize a measurement tool which is self-calibrating. A related object is to avoid the need for making initial calibrations. Another related object is to eliminate the need for setting a measurement scale with respect to a reference point. It is apparent that degradation in the measurement instrument or a missetting will cause an error in the measurement.

A further object of the invention is to achieve a measurement tool which can be set for operation with assurance that the equilibrium reading associated with the instrument will represent a true origin.

A still further object of the invention is to achieve a measurement tool in which readings beyond equilibrium provide an accurate representation of measurement displacement.

SUMMARY OF THE INVENTION

In accomplishing the foregoing and related objects, the invention provides a measurement device in which a housing contains a linearly movable member and provision for converting the position of the member within the housing to a measurement indication. The member is advantageously movable with respect to an electromechanical transducer in the housing in order to provide the desired measurement indications. The member is advantageously at a position of minimum displacement when it is at rest. This achieves self-calibration by having the member return to its non-displacement equilibrium position at the conclusion of each measurement.

In accordance with one aspect of the invention the member is mounted within the housing on an alignment bushing which is relatively lubricous with respect to the member. The member is typically of ferrous or equivalent material and is harder than the bushing which is of bronze or equivalent.

In accordance with a further aspect of the invention the linearly displaceable member includes a contact that extends transversely with respect to the axis of the member. The contact includes at least one tip for making measurements with respect to a prescribed position of the housing. The contact can include other tips for making other kinds of measurements, for example depth measurements as well as extension measurements.

In accordance with yet another aspect of the invention the transformer within the housing a substantially linear signal relative to a core position. An interface can be used to drive the converter and a demodulator can receive a signal from the converter and apply it to a display. An analog-to-digital converter can be affixed to the interface in order to provide a measurement magnitude signal. The converter can include a counter which provides a signal level corresponding to the calibration level of the device and/or an increment beyond the calibration level. The housing can include an attachment member to permit the apparatus to be securely positioned on the surface to allow the user to use both hands in accomplishing desired measurements.

In accordance with still another aspect of the invention a measurement method includes linearly moving a member with respect to a fixed position by a displacement magnitude that is to be determined and converting the displacement of the core to an electrical signal. The electrical signal resulting from the displacement of the core is further converted to an indication of the displacement. The member is advantageously movable with respect to a linear variable differential transformer. This transformer is desirably driven by a sine wave signal having a prescribed frequency as it is transformed to a signal having a different amplitude in accordance with the extent to which the member is displaced from its equilibrium position. The output of the device in electrical form has a fixed magnitude corresponding to the equilibrium position and/or an increment corresponding to an amount by which the member is displaced from the equilibrium position. The housing is securely positionable upon a surface and is advantageously magnetically securable.

In accordance with a method of fabricating a measurement device according to the invention, a linearly movable core is provided for a transformer in a housing and a measurement contact is attached to the core.

DESCRIPTION OF THE DRAWINGS

Other aspects of the invention will become apparent after considering several illustrative embodiments, taken in conjunction with the drawings in which:

FIGS. 2B and 2C are enlargements of the respective upper and lower portions of the device of FIG. 2A;

DETAILED DESCRIPTION

Figure 1A:
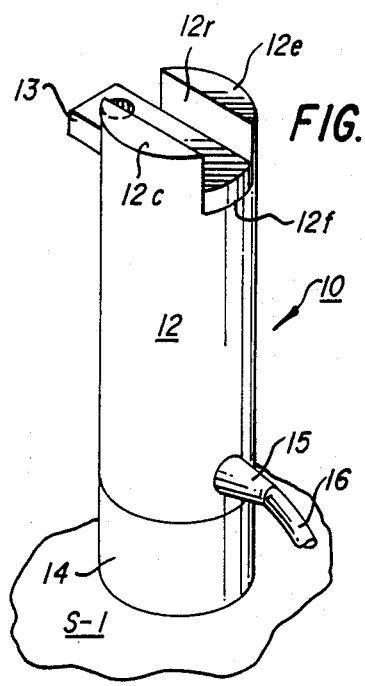
FIG. 1A is a perspective view of a measuring device in accordance with the invention with its measuring arm in equilibrium for self-calibration.

With reference to the drawings, FIG. 1A shows a measuring tool 10 in accordance with the invention. The tool 10 is formed by a body 12, a base 14 affixed to the body 12 and a movable gauge arm 13. The arm 13 moves within a recess 12r at the upper portion of the housing 12 and is shown in its self-calibrating equilibrium position in FIG. 1A, with the arm 13 resting against a flange 12f of the recess 12r. Extending from the housing of the body 12 is a cable 16 that is attached by a cable seal 15. The cable 16 extends to an indicator, such as the unit 30 of FIG. 1B.

Figure 1B:
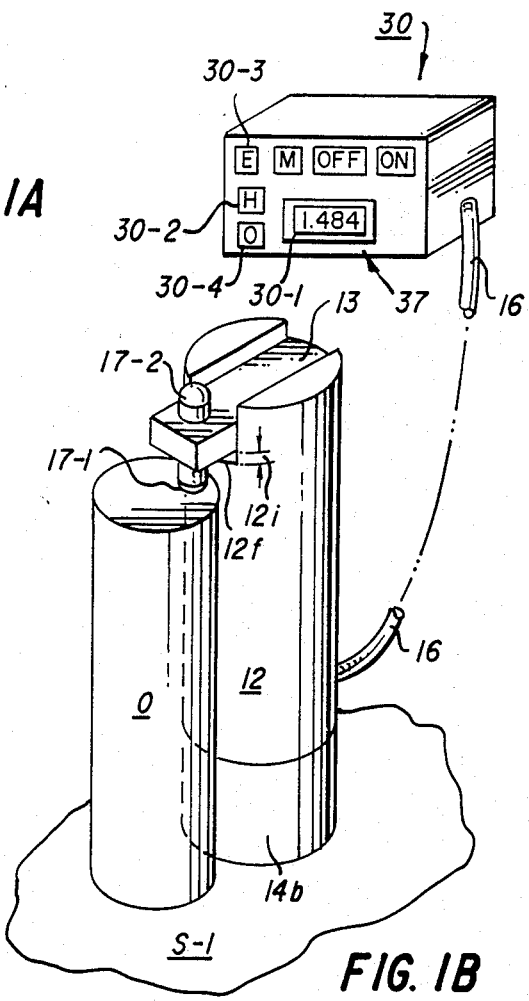
FIG. 1B is a perspective view of the measuring device of FIG. 1A showing the measuring arm used in determining length or height of an object with respect to the measurement base.

The measurement device 10 of FIG. 1A can be used in various modes. FIG. 1B shows the device 10 being used to determine the precise height or length of an object O with respect to the base 14b of the support housing 14. For that purpose, the gauge arm 13 is provided with a tip 17-1. Consequently, the measurement indicated on the unit 30 at the viewing window 30-1 is the sum of the calibration height to the flange 12f and the increment 12i by which the arm 13 is elevated above the flange 12f.

Figure 1C:
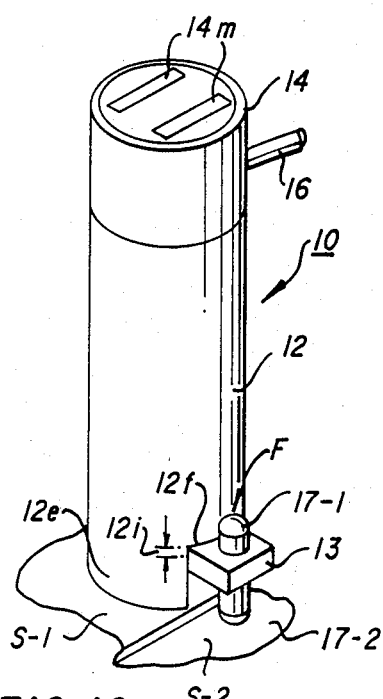
FIG. 1C is a perspective view of the measuring device of FIG. 1A being used a depth gauge.

An alternative employment of the measuring device 10 is shown in FIG. 1C, where the body housing 12 has been inverted. By contrast with FIGS. 1A and 1B, the gauge arm 13 has a lower tip 17-2 projecting toward a surface S-2 that is to be measured with respect to a reference surface S-1. As indicated in FIG. 1A, the equilibrium position for the arm 13 is against the flange 12-f, so that a depth measurement requires extending the arm 13 until the tip 17-2 is in contact with the surface S-2. The desired extension is achieved by the application of slight force in the direction of the arrow F. The required depth measurement is the incremental distance $12i^1$ with respect to the flange reference 12f. For a depth measurement, the flange 12f serves as a zero reference, by contrast with the base 14b in the case of a height measurement pursuant to FIG. 1B.

In addition, FIG. 1C shows the base housing 14 with mounting magnets 14m. Consequently when the housing 12 is positioned as shown in FIGS. 1A and 1B, with the base 14b in contact with the surface S-1, the device 10 is held in place by magnetic action. It will be appreciated that similar magnetic members may be included in the extension 12e of the housing 12 with respect to the flange 12f of the recess 12r.

Figure 1D:
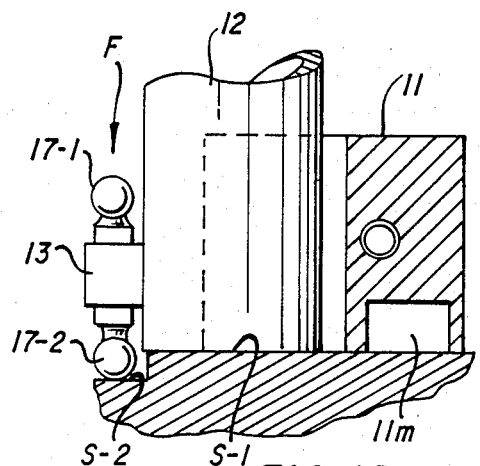
FIG. 1D is an enlargement of a portion of the measuring device of FIG. 1C further illustrating the depth gauge employment.

An enlarged view of the bottom portion of the housing 12 in FIG. 1C is shown in FIG. 1D, with the arm 13 is depressed in the direction of the arrow F, so that the contact made by the tip 17-2 with the surface S-2 is clearly indicated. In addition, the embodiment of FIG. 1D shows an auxiliary holder 11 that is used in positioning the housing 12. It will be apparent that the auxiliary holder 11 may include a magnet 11m or other retentive mechanism, for securing the housing 12 against the surface S-1.

Figure 2A:
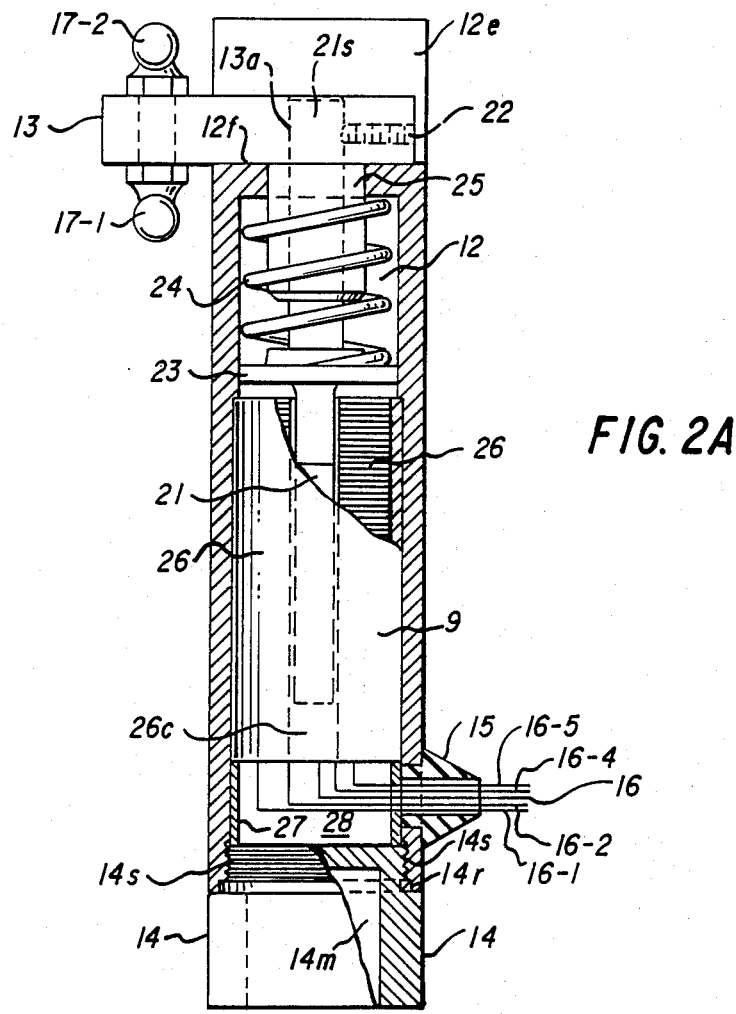
FIG. 2A is a cross-sectional view of the measuring device of FIG. 1A showing its internal constituents.

Details of the interior of the device 10 are shown in FIG. 2A which is a cross-sectional view of FIG. 1A. The gauge arm 13 is attached to an interior, movable shaft 21s of a core 21. In the embodiment of FIG. 2A the core shaft 21s is secured to the gauge arm 13 by a locking screw 22. The core shaft 21s is accommodated in the arm 13 at an arm aperture 13a. The core shaft 21s includes an extension 23 which serves as the base for a spring 24 that maintains the arm 13 against the flange 12f when the arm is in its equilibrium or rest position, and no measurement, or a zero measurement, is being made. A bushing 25 assures proper alingment of the upper portion of the core shaft 21s in the central cavity 26c of a transformer 26. The transformer 26 is held in position by a retaining ring 27 within a wiring cavity 28. The base housing 14 is sealed to the main housing 12 by an O-ring 14r below screw threads 14s. The wiring cable 16 attached to the transformer 26 includes leads 16-1 through 16-5. These leads are used to energize the transformer and to apply a response signal from the transformer to the measurement unit 30 of FIG. 1B.

Further details for the upper portion of the interior of the housing 12 are shown in FIG. 2B. Particularly shown is the upper portion of the core 21 connected to the lower portion of the shaft 21s. In FIG. 2B this connection is illustratively made by a core connecting set screw 29. Further details for the lower portion of the body housing 12 are shown in FIG. 2C.

Figure 3:
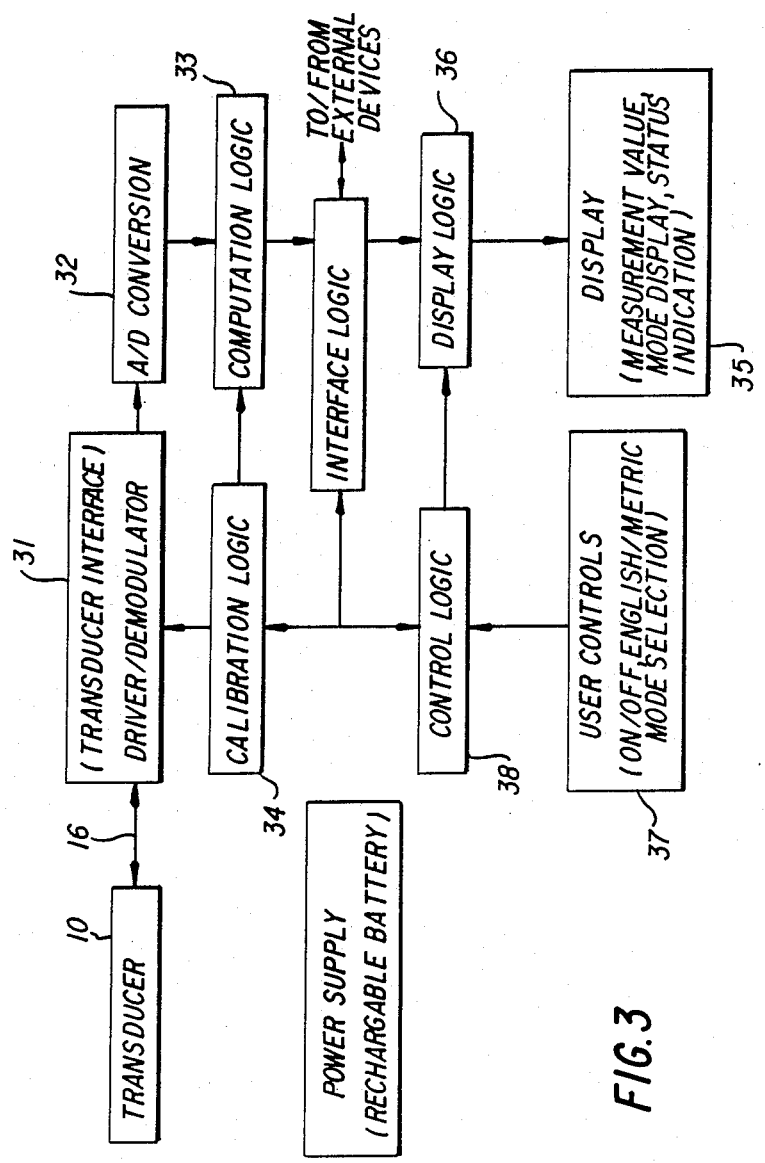
FIG. 3 is block diagram of a conversion and display unit for the measuring device of FIG. 1A.

The constituents for the measurement unit 30 of FIG. 1B are set forth in the block diagram of FIG. 3. The measuring unit 10 is a transducer since it converts a distance measurement or indication to an electrical signal. In order to achieve the desired conversion, it is necessary to energize the transformer 26 of FIG. 2A. For that purpose the measurement unit includes a transducer interface 31 containing a driver and a demodulator. The driver (not shown) is the energizing source for the transformer 26 of FIG. 2A, providing a since wave signal which illustratively has a frequency in the range from 2 to 5 kilohertz. The energizing sine wave signal is applied to the transformer over leads 16-1 and 16-2 to energize the windings and the transformer 26. This gives rise to a return signal along leads 16-4 and 16-5 that depends upon the position of the core 21. When the core 21 is in its equilibrium position, the return sinusoid has an amplitude such that, when converted in the manner described below, there will be an equilibrium reading, for example 1.484 inches in the viewing window 30-1 when the instrument 30 is set for a height measurement (by depressing the height control button 30-2 and the "English" measurements button 30-3).

The return signal from the measurement unit, i.e. transducer, 10 is converted by a demodulator (not shown) within the interface 31. This conversion produces a signal level that is proportional to the position of one of the tips 17-1 or 17-2. The signal level from the demodulator in the block 31 is applied to a converter 32 which effects an analog-to-digitial conversion.

In the display unit 30, the output of the demodulator in the interface 31 is applied to an analog-to-digital converter 32. The analog-to-digital converter transforms a voltage level to a digital counterpart. Thus if the analog level has a value of ten volts, the digital counterpart of ten is 1010. The 1010 digital value is represented by a train of pulse signals with a pulse signal corresponding to a 1 and the absence of a pulse signal corresponding to a 0. The digital signal or pulse train is applied to computation logic 33 in the form of a counter. Where the measurement unit is to be used in the mode of FIG. 1B, the measurement corresponding to the height of the flange 12f above a base 14b is initially entered into the counter 33 when the height control knob 30-3 is depressed. This activates the calibration logic network 34 that assures that the measurement tip 13 is its equilibrium position and feeds a digital signal to the counter 33 corresponding to the elevation of the flange 12f above the base 14b. As indicated in FIG. 1B the viewing window 30-1 includes a value of 1.484 inches for the equilibrium setting. For calibration purposes this value is assumed to be 1484 and corresponds to a binary signal of 10111001100. This is because the first binary digit is in the tenth digit position so that $2^{10}$ equals 1024 plus $2^8$ equals 256 plus $2^7$ equals 128 plus $2^6$ equals 64 plus $2^3$ equals 8 and $2^2$ equals 4. The decimal equivalents of the various binary digits become 1484 as indicated. Consequently the calibration logic, upon activation, feeds into the counter the binary signal indicated. Because of the magnitude of the binary signal it is necessary for the counter to have at least 11 stages. The digital signal that is added into the counter 33 from the conversion network 32 therefore supplements the count that is entered into the counter upon calibration.

In any event the count of the computer, which is in binary, is applied to a display 35 through logic 36. In effect the logic converts the binary count into a decimal with a decimal point in the proper position. This can be accomplished in a variety of well-known ways. One technique is to use a reverse digital-to-analog converter so that the output of the logic 36 as applied to the display 35 is a voltage level in accordance with the count of the counter.

When the unit 10 is used to measure depth, there is no initial calibration value. And upon a setting of the depth switch 30-4 to an operational position, the counter 33 is set to its zero position so that that any incremental value beyond zero which is applied through the transducer interface 31 into the converter 32 provides directly the counterpart of the converted signal which is then visable on the display 35.

In FIG. 3 the various user controls which appear in FIG. 1A are shown on a control panel 37. These include the on-off switch, the "English" conversion, the metric conversion, and the volt selection. These switches act through control logic 38 in straightforward fashion to determine the operation of the calibration logic. Thus, as noted above, when a depth measurement is being made the calibration logic zeros the computer 33. When a height measurement is being made the calibration logic enters the value 1484 into the counter if the units are in English measure or the metric counterpart if the units are metric. It is well known, for example, that the metric counterpart of 1.484 inches is 3.769 centimeters. Consequently the calibration signal, when the device 10 is used to measure height in the metric system, has a normalized value of 3769 and the counter is set accordingly. For that purpose the digital equivalent is 11101011001. This requires a twelve stage counter and an extra stage is used in order to make the metric calibration setting. Otherwise the procedure is as described before.

Figure 4B:
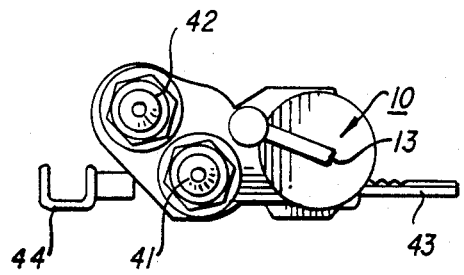
FIG. 4B illustrates the use of the invention in providing a required setting for the injector of FIG. 4A.
Figure 4A:
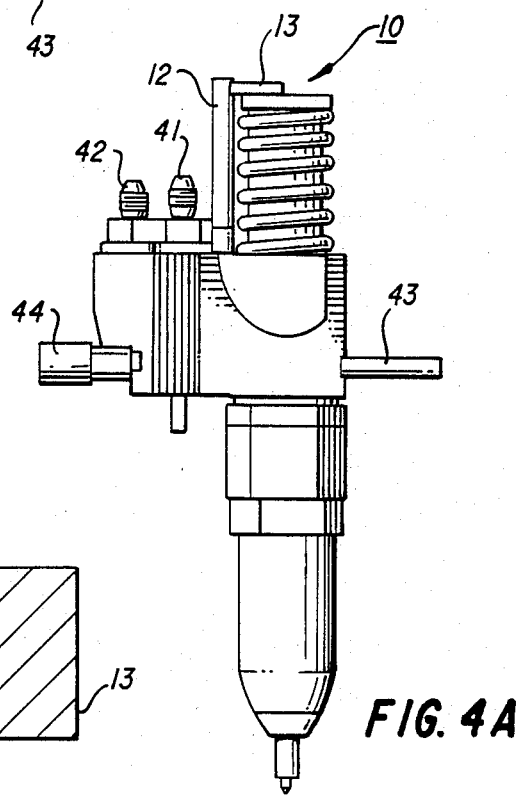
FIG. 4A is a plan view of an injector which is provided with a required setting in accordance with the invention.

One use of the invention in setting the injector of a diesel engine is illustrated in connection with FIGS. 4A and 4B. FIG. 4A shows an illustrative injector pump 40. The pump has an inlet 41 and an outlet 42. The injector has a rack 43 that terminates in a clevis 44. The clevis is a U-shaped piece through which is pin is rung to provide an attachment to the injector rack. The head of the injector is required to have a carefully prescribed setting with respect to the injector body. This is readily achieved by use of the invention which allows the measurement unit 10 to be placed in an accessible position and simultaneously allows user access to a direct reading while adjusting the setting of the injector without any impaired visual inconvenience that is characteristic of the presently used tools for adjusting the injector.

Figure 5:
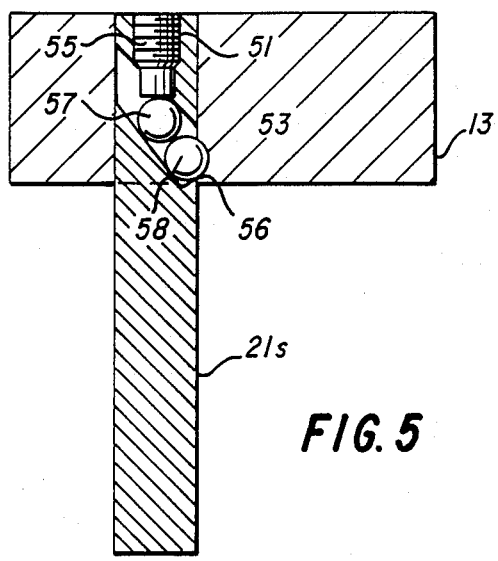
FIG. 5 is a cross-sectional view of an alternative attachment of the guage arm of FIG. 2A to its core and shaft.

As noted in FIG. 2A, the arm 13 is held to the shaft 21s by a set screw 22. An alternative technique for securing the arm 13 to the shaft 21s is illustrated in FIG. 5. In FIG. 5 the shaft 21s is provided with a longitudinal bore 51 and a passageway 52 which intersects the bore at an angle. The shaft 21s is provided with an inclined passageway 53 which is advantageously at an angle of 45 degrees to a vertical center line through the shaft 21c. This passageway is open at the left as seen in FIG. 5 and has a retaining shoulder 56 at the lower right hand portion. Two balls 57 and 58 are shown in the passageway 55 and are restrained from exiting through the passageway at the lower right by the shoulder 56. One of the balls 57 or 58 can partially exit at the passageway 55 past the outer surface 51 of the shaft 21s. A nose piece 55 is provided with an extension 56 and a flat end surface 57 to engage the uppermost one of the balls 58. Threads 58 are engaged with threads 53 in the shaft 21s. The nose piece 55 has a knob which extends from a portion which may be knolled for ease of gripping and is provided with a vertical slot and two horizontal slots.

In order to secure the arm 13 to the shaft 21c in accordance with FIG. 5, the nose piece is rotated to cause the balls 58 and 59 to move downwardly in the passageway 55 until the lower most one protrudes past the surface 51 and is restrained from further movement by the shoulder 56. The movement of the lower ball 58 in the passageway 55 brings it into contact with the inside wall of the aperture 13a in the arm 13. This provides a secure connection of the arm 13 to the shaft 21s. While the embodiment of FIG. 5 has been illustrated using two balls 58 and 59, it will be appreciated that a single ball can be used depending upon the proportionment of the passageway 55 relative to the rest of the structure. In addition it will be appreciated that while balls have been used as the mechanism for attachment, other movable members may be used alternatively. Thus a member of general configuration in the passageway 55 may be forced into contact with the inner wall of the adjoining aperture in the arm 13. Thus it will be appreciated that the use of the balls, and in particularly the use of two balls in FIG. 5, is for illustration only and that other forms of attachment may be employed in accordance with the invention.

Similarly, the core 21 may be attached to the shaft 21s in FIG. 2B by using an arrangement similar to that of FIG. 5. For that purpose a tapering hole with a ball extends from the core 21 to the shaft 21s, or vice versa. The ball is then forced into the tapering hole to provide a jam fit between the core and the shaft. Other adaptations of the arrangement of FIG. 5 will be apparent to those of skill in the art.

It will be understood that the foregoing detailed description is for illustration only and that various modifications, adaptations, as well as alterations in parts and the substitution of equivalents, etc. will be apparent to those of ordinary skill in the art.

In particular, the transducer may take a wide variety of forms in addition to the transformer that is illustrated.

What is claimed is:

1. A self-calibrating measuring tool comprising
a housing having a base and a recess terminated by a precisely located flange with respect to said base;
a linearly movable member within said housing;
a measurement arm attached to said movable member disposed against said flange in equilibrium; and
means for converting the position of said movable member within said housing to a measurement indication.

2. Apparatus as defined in claim 1 wherein said movable member is mounted within said housing within an alignment bushing which is of a relatively lubricious material with respect to said member.

3. Apparatus as defined in claim 2 wherein said movable member is ferrous and is harder than said bushing which is bronze.

4. Apparatus as defined in claim 1 wherein said movable measurement arm includes a contact that extends transversely in a channel of said housing with respect to the axis of said measurement arm.

5. Apparatus as defined in claim 4 wherein said gauge member contact includes opposed and separated tips for making measurements with respect to a prescribed position of said housing.

6. Apparatus as defined in claim 4 wherein said gauge member includes a plurality of linearly displaced tips for making measurements;
thereby to permit said arm to be used for making depth as well as extension measurements.

7. Apparatus as defined in claim 1 wherein said movable member provides a substantially linear signal.

8. Apparatus as defined in claim 1 wherein said converting means includes an interface for driving said means for converting and a demodulator for receiving a signal from said for converting and applying it to a display.

9. Apparatus as defined in claim 8 further including an analog-to-digital converter affixed to said interface and means responsive to said converter for providing a measurement magnitude signal.

10. Apparatus as defined in claim 9 wherein said converter comprises a counter which provides a signal level corresponding to the calibration level of said device plus and/or an increment beyond said calibration level.

11. A measuring tool as defined in claim 1 wherein said recess in said housing is terminated by opposed flanges and said measurement arm is in contact with the opposed flanges in equilibrium.

12. A measuring tool as defined in claim 1, wherein said precisely located flange establishes a position of known displacement for said measurement arm in equilibrium at a location intermediate opposed ends of said housing.

13. A measurement method comprising the steps of:
(a) linearly moving a retained member out of contact with a fixed calibration position intermediate opposed ends of a housing for the member, by a displacement magnitude that is to be determined;
(b) converting the displacement magnitude of said member into an electrical signal; and
(c) converting said electrical signal to a digital counterpart as an indication of said displacement.

14. The method of claim 13 wherein said member is movable with respect to a linear variable differential transformer.

15. The method of claim 14 wherein said member has an equilibrium position and said linear differential transformer is driven by a sine wave signal having a prescribed frequency and said signal is transformed to a signal having a different amplitude in accordance with the extent to which member is displaced from its equilibrium position.

16. The method of claim 15 wherein the output of said device in electrical form has a fixed magnitude corresponding to said equilibrium position and/or an increment corresponding to the amount by which said member is displaced from said equilibrium position.

17. The method of claim 13 wherein said member is in a housing which is securely positionable upon a surface.

18. The method of claim 17 wherein said housing is magnetically positionable.

19. The method of fabricating a measurement device which comprises the steps of:
(a) providing a biased longitudinally extending and linearly movable core for a transformer in a housing; and
(b) attaching to said core a lateral measurement arm which is in equilibrium contact with said housing and movable along a recess of said housing.

* * * * *